June 13, 1967  J. B. KEIR  3,324,882
DUAL PRESSURE RELIEF VALVE SYSTEM
Filed April 16, 1965

INVENTOR.
JOHN B. KEIR
BY
ATTORNEYS

June 13, 1967  J. B. KEIR  3,324,882
DUAL PRESSURE RELIEF VALVE SYSTEM
Filed April 16, 1965

INVENTOR.
JOHN B. KEIR
BY
ATTORNEYS ically United States Patent Office 3,324,882
Patented June 13, 1967

3,324,882
DUAL PRESSURE RELIEF VALVE SYSTEM
John B. Keir, Madison Heights, Mich., assignor to Sperry Rand Corporation, Troy, Mich., a corporation of Delaware
Filed Apr. 16, 1965, Ser. No. 448,672
9 Claims. (Cl. 137—596.13)

This invention relates to power transmissions and is particularly applicable to those of the type comprising two or more fluid pressure energy translating devices, one of which may function as a pump and another as a fluid motor.

The invention is generally concerned with a hydraulic power transmission system for controlling a plurality of motors at different pressures and more particularly with a multiple, directional control valve bank system for controlling a plurality of motors at different operating pressures.

Multiple valve bank systems have been widely used in mobile road machinery and agricultural applications and comprise a plurality of directional control valves in a side-by-side relationship having therein any desirable combination of single- and double-acting valve spools for controlling single- and double-acting motors, such as exemplified by the patents to Berglund, No. 2,289,567, which issued July 14, 1942, and to Twyman, No. 2,247,140, which issued June 24, 1941.

Improvements of such systems are exemplified in the patent to James Robinson, No. 2,489,435, and the patent to Ernst F. Klessig, No. 3,077,901, both patents disclosing multiple valve bank systems having a dual function, flow control and pilot valve actuated, balanced-type relief valve incorporated in the system. Patent No. 2,489,435 discloses a main relief valve having a separate pilot valve for controlling the operating pressure of the system; and Patent No. 3,077,901 discloses a main relief valve of the substantially balanced type having an integral pilot valve mounted therein for controlling operating pressure of the system.

In both of such multiple valve bank systems, the maximum operating pressure of all motors in the hydraulic power transmission system would be the same, as determined by the loading of the single pilot valve operated main relief valve. There are, however, many hydraulic power transmission systems having a plurality of hydraulic motors wherein it is desirable to have a high operating pressure for one motor and a substantially lower operating pressure for another motor or motors in the system, for example, in lift trucks or front-end loaders or loading buckets, when it is desirable to hoist or raise the load device at high operating pressure but have the tilting operation of the same at a much lower operating pressure.

It is therefore, an object of this invention to provide for a hydraulic power transmission system having a plurality of motors requiring different operating pressures, an improved and simplified dual pressure relief valve system.

It is a further object of this invention to provide an improved control valve system which is completely adequate to meet a greater variety of hydraulic applications, particularly as to requirements for dual operating pressures.

It is still another object of this invention to provide an improved multiple, directional valve bank control system which provides all of the advantages of the prior art types, and in addition, provides a dual pressure relief valve function.

It is a further object of this invention to provide a multiple valve bank control system having incorporated therein a pilot valve controlled, main relief valve of the balanced type, and an auxiliary pilot relief valve, preferably in cartridge form associated with the directional control valves of the bank in such a manner that the main relief valve is enabled to operate at a high pressure when one of the control valves of the system is operated and enables the same relief valve to operate at a relatively lower pressure when another directional valve in the system is operated.

Further objects and advantages of the persent invention will be apparent from the following description, reference being had to the accompanying drawings wherein a preferred form of the present invention is clearly shown.

Figure 1:
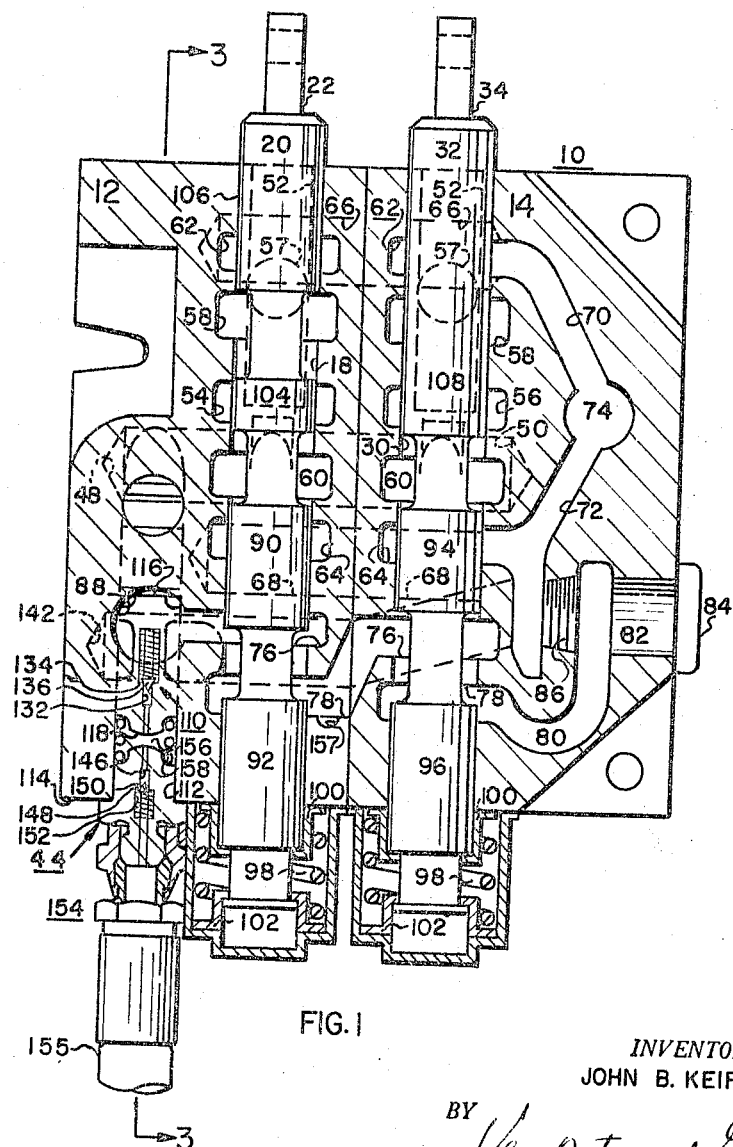
FIGURE 1 is a sectional view taken on line 1—1 of FIGURE 3 illustrating a hydraulic multiple valve bank control system embodying a preferred form of the present invention.
Figure 4:
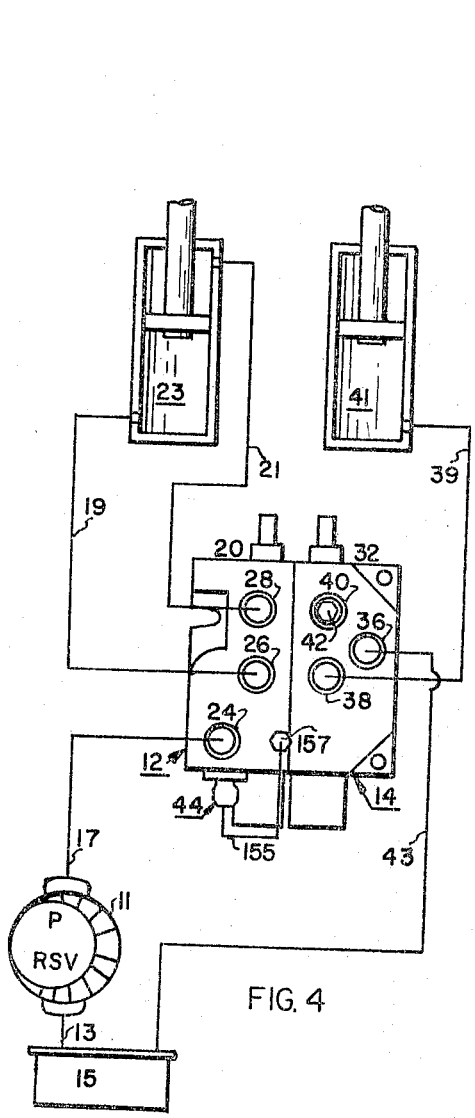
FIGURE 4 is a diagrammatic view of a hydraulic power transmission system embodying a preferred form of the present invention.
Figure 3:
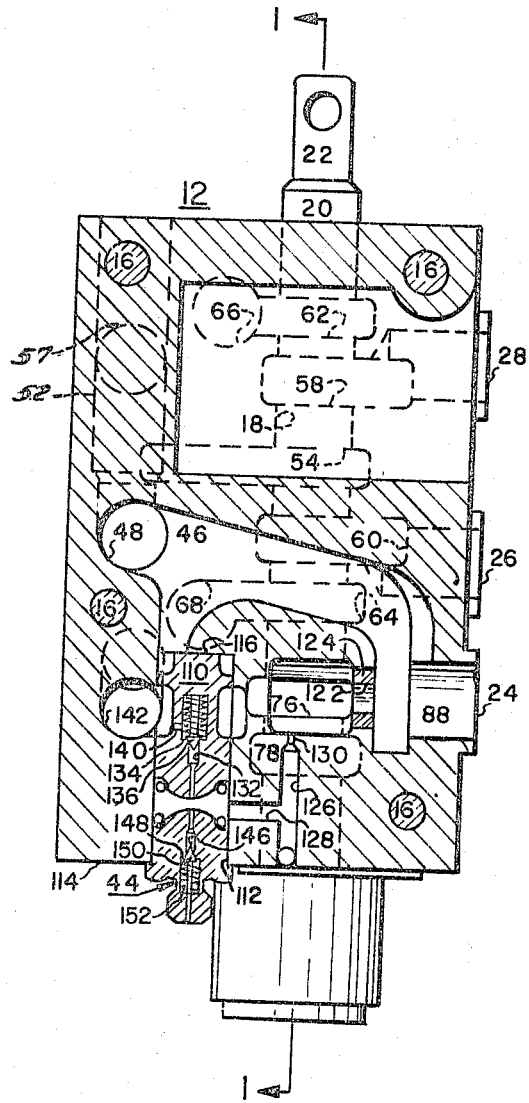
FIGURE 3 is a sectional view taken on line 3—3 of FIGURE 1.

Referring now to FIGURES 1 and 3, there is shown a hydraulic, multiple valve bank, directional control system, indicated generally by the numeral 10, comprising two directional control valve housing sections 12 and 14 held together in the usual manner by a plurality of bolts 16. The housing section 12, which will be referred to as an inlet section, has a longitudinal bore 18 within which is shiftably mounted a directional control valve spool 20 for controlling a double-acting motor and which has a stem 22 extending from the housing for manually, selectively operating the same. The inlet section 12 is provided with external connection ports, shown in FIGURE 3, which are a pressure delivery or inlet supply port 24, adapted for connection to a fluid pump, and utilization or motor ports 26 and 28, adapted for connection to a double-acting motor. Thus, the multiple valve bank control system 10 may be incorporated in a hydraulic power transmission system, shown in FIGURE 4, comprising a pump 11 driven by a prime mover, not shown, which is connected by a supply line 13 to a tank 15 and by a pressure delivery conduit 17 to the pressure delivery port 24 of housing inlet section 12. Motor ports 26 and 28 of inlet section 12 are, respectively, connected by conduits 19 and 21 to opposite ends of a double-acting motor 23.

The valve section 14, which will be referred to as an outlet section, is provided with a longitudinal bore 30 within which is shiftably mounted a directional control valve spool 32 having a stem 34 extending from the housing, the valve spool being of the type for controlling the operation of a single-acting motor. The outlet section 14 is provided with an external connection return or tank port 36 and also with external connection utilization or motor ports 38 and 40 (shown in FIGURE 4), port 38 being adapted to be connected by a conduit 39 to the raise or lift port of a single-acting motor 41, while, the motor port 40 is not used and is closed by a suitable plug 42. Tank port 36 of outlet section 14 is connected to tank 15 by a conduit 43. The motors 41 and 23 may be respectively connected to a load device to be raised and tilted, such as in a lift truck or the bucket of a front-end loader, the motor 41 being adapted to be operated under a relatively higher pressure than the operating pressure of motor 23.

It should be understood that with valve banks of the type disclosed, any number of intermediate valve sections may be placed in the bank between the inlet and outlet sections; and valve spools for controlling either single- or double-acting motors may be placed in any of the intermediate valve sections, it merely being necessary to close one of the motor ports of any valve section in which is mounted a directional control valve spool of the type disclosed for controlling a single-acting motor. It should also be understood that the intermediate sections will be eliminated, as shown, where only two fluid actuated devices are to be controlled.

The pressure delivery port 24 in the inlet section 12 is connected by a flared, cored recess 46 to a pressure delivery passage 48 which extends through housing 12, the opening on the opposite face of which is adapted to register with the opening of a pressure delivery passage 50 in outlet section housing 14 and having a closed end therein.

Each section is provided with a check valve bore spaced apart from the directional valve bore in its associated housing, the inner ends of which are intersected by the pressure delivery passage in its respective section. Both check valve bores are shown in dotted lines in the inlet and outlet sections by the numeral 52. For the purpose of convenience, the check valves which are adapted to be mounted in the bores 52 have not been shown; but it should be understood that when mounted in the bores 52, they open upwardly to connect the said check valve bores to a pressure port 54 of directional valve bore 18 and a pressure port 56 of directional valve bore 30. The check valve bores are adapted to be closed at one end thereby by plugs, which are indicated by the numeral 57.

Each directional valve bore is provided with utilization or motor ports 58 and 60 on opposite sides of its associated pressure port and which independently lead to their respective external connection utilization or motor ports and are also provided with return ports 62 and 64 spaced apart, respectively, from their utilization or motor ports 58 and 60. Two return passages 66 and 68 are formed in each housing to form two common return passages for the system, which passages respectively connect with cored return passages 70 and 72 in outlet section 14, the latter passages merging with a single return or tank passage 74 leading to the external connection tank or return port 36. The return passages 66 and 68 in each housing are connected, respectively, to the valve bore return ports 62 and 64 in said housings.

There is also provided a common by-pass or unloading passage which is formed as follows: each valve bore of the respective inlet and outlet housing sections is provided with spaced-apart by-pass ports 76 and 78, the by-pass port 78 of inlet section 12 opening to a face of said housing to register with the opening of by-pass port 76 of outlet section 14. By-pass port 78 of housing section 14 is connected by a passage 80 to a passage 82, passage 82 in turn being connected to passage 72 which leads to the tank passage 74. As shown in FIGURE 1, passage 82 is closed at one face of the housing section 14 by a closure member 84 and is threaded at 86, ahead of its connection to passage 72, for the insertion of a threaded plug member when the closure member 84 is removed, for the purpose of connecting thereto and controlling an auxiliary motor by a controlled flow through unloading or by-pass passages 76 and 78. When it is not desired to control an auxiliary motor by controlled by-pass flow, the closure member 84 is utilized and no plug is inserted in passage 82. A by-pass passage 88 in the inlet housing section 12 connects the inlet port 24 thereof to the by-pass port 76 of valve bore 18 in housing section 12.

Each directional control valve spool is provided with spaced-apart lands for closing either the by-pass port 76 or 78 and, thus, closing the common by-pass passage. Thus, the valve 20 is provided with lands 90 and 92 for respectively closing the by-pass ports 76 and 78 of valve bore 18; and the valve spool 32 is provided with lands 94 and 96 for closing the by-pass ports 76 and 78 of its associated valve bore 30. Each directional control valve spool is biased to the centered position shown by a spring 98 located between retainers 100 and 102.

The valve spool 20 is also provided with spaced-apart lands 104 and 106; while, the valve spool 32 is provided with a land 108, spaced apart from land 94. In the neutral position of the valve spools shown, the pressure ports 54 and 56 of valves 20 and 32 are closed from communication with the motor ports 58 and 60 of such valves. When the valve spool 20 is shifted upwardly, the land 104, which had blocked pressure port 54 from the motor port 60, will now open communication between said ports; while, motor port 58, which had been formerly closed from both the pressure and return ports 54 and 62, will now be connected to the return port 62. When valve spool 20 is shifted downwardly, pressure port 54 is connected to motor port 58; while, motor port 60 will be connected to return port 64.

When valve spool 32 of outlet section 14 is shifted upwardly, pressure port 56 of said valve, which had been closed from the motor port 60, is now open thereto; and when the valve spool 32 is shifted downwardly from the position shown, motor port 60, which had been blocked from return port 64, is placed in communication with said port.

Figure 2:
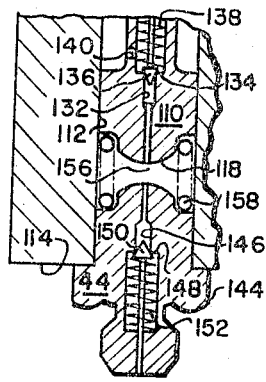
FIGURE 2 is a partial sectional view, on an enlarged scale, of a portion of the valve bank control system shown in FIGURE 1.

Means for maintaining regulated flow rate through the unloading or by-pass passage when all the valves are in the neutral position, and for by-passing or shunting the remainder of the pressure fluid supply completely around the individual valve spool members by a separate passage connected to the return passage, is provided by the mounting of a flow control valve piston, indicated generally by the numeral 110 in a bore 112 opening to a face 114 of the inlet housing section 12. The control piston 110 is provided with opposed balanced operating surfaces 116 and 118. For the purpose of connecting inlet pressure to the operating surface 116, the flared inlet recess 46 in section 12, and which is connected to the pressure delivery port 24, is not only connected to pressure delivery passage 48 but also communicates with the valve bore 112 and the operating surface 116 of the operating piston 110. A throttle 122 is placed in the inlet passage 88 beyond the connection of the flared recess 46 thereof to passage 88 to make the operating surface 116 responsive to inlet pressure ahead of the throttle 122. The throttle 122 is provided or formed in a throttling plug 124 threaded into the passage 88. The operating surface 118 is exposed to pressure beyond the throttle 122 by means of a passage 126 connected to passage 88 and by a passage 128 connected to the bore 112. Interposed in the passage 126 is a restriction 130. The operating piston 110, which performs the function of an overflow or by-pass type of flow control valve with the cooperation of an integral pilot valve mounted therein; and the restriction 130 is adapted to cooperate in the relief valve function of the flow control valve piston 110. As shown more clearly in FIGURE 2, the operating piston 110 is provided with a passage 132 having a seat 134 therein, upon which rests a pilot valve 136 biased thereto by a spring 138. The pilot valve 136, in the position shown, closes communication between the passage 132 and a passage 140 which leads directly to an isolated exhaust passage 142. The spring 138 will determine the highest maximum operating pressure for the hoist operation of motor 41.

A pilot valve cartridge assembly 44 is mounted in inlet section 12 and comprises a body or housing 144 fitted into bore 112 from the face 114 of inlet section 12, the body 144 having a passage 146 provided with a shoulder forming a seat 148 upon which is biased a second pilot valve member 150 by means of a spring 152. Passage 146 opens to a swivel connection 154 attached to which is a fluid hose member 155, the opposite end of which is adapted to be connected to a specially constructed external connection port 157 in inlet section 12, shown in FIGURE 4, which leads directly to by-pass port 78 of inlet section 12, as shown in FIGURE 1. Whereas, the spring 138 for pilot valve 136 determines the pressure at which a hoist or lifting operation by the motor 41 will be performed; the rating of spring 152 of pilot valve 150 determines the lower pressure at which a tilt operation will be performed by motor 23.

With the body 144 of pilot valve cartridge assembly 44 fitted in bore 112, as shown, the inner end of the cartridge assembly is opposed to and separated from operating surface 118 of the control piston 110 within which pilot valve 136 is mounted in an opposed relation to pilot valve 150 and forms a chamber 156 between the pressure responsive operating surfaces of the pilot valves which is directly connected to the passage 128 thereby exposing both pilot valves to inlet supply pressure. Located in chamber 156 is a spring 158 which normally tends to maintain the control piston 110 in a position closing communication between the pressure delivery inlet recess 46 and the exhaust passage 142 which extends through the housing sections 12 and 14 to the return or exhaust passage 72 in outlet section 14 leading to tank passage 74.

The spring 158 normally maintains the flow control valve piston 110 to a position wherein the inlet recess 46 is closed to the isolated exhaust passage 142. As the opposed operating surfaces 116 and 118 are substantially balanced, the operating piston 110 will be shifted downwardly when a pressure drop equal to the loading of spring 158 is reached for the purpose of dumping fluid in excess of a desired regulated flow in the by-pass passage back to the tank passage through the isolated exhaust passage 142. Thus, the operating piston 110 functions to maintain the pressure drop across the throttle 122 in the by-pass passage, as determined by the loading of spring 158, substantially constant and thus the flow through the unloading or by-pass passage at a regulated rate. However, the operating piston 110 is only effective as a flow control valve for the by-pass or unloading passage when both valves 20 and 22 are in the neutral position. When either valve spool is operated, the by-pass passage is closed to flow through the unloading passage from the inlet section to the outlet section return port and thus, there will not be a differential of pressure on the opposed operating areas of the piston 110. The operating piston 110 will continue, however, to perform the function of a main relief valve with the cooperation of either pilot valve 136 or pilot valve 150.

For a description of the function and operation of control piston 110 as a flow control valve, reference may be had to the patent to James Robinson, No. 2,489,435, or the patent to Ernst F. Klessig, No. 3,077,901; and for the operation of the control piston 110 as a main relief valve wherein the pilot valve is integral therewith, Pat. No. 3,077,901.

In order to provide a system wherein high pressure may be utilized for one motor, such as for a raise or lift operation, and a substantially lower pressure for the operation of another motor, such as for a tilt operation of the load device, a second pilot valve is added to a multiple valve bank system, such as disclosed in Pat. No. 2,489,435 and Pat. No. 3,077,901. The second pilot valve is incorporated in the cartridge assembly 44 which is preferably fitted into a bore 112 already occupied by the dual function, flow control and main relief valve operating piston 110. A flexible hose 155 is connected to the exhaust chamber or passage 146 of the second pilot valve and to the external connection port 157 of valve housing 14 having therein the single-acting hoist valve spool.

The arrangement is such that when a tilt operation is being performed, which requires a lower operating pressure than a hoist operation, the pilot valve 150 will control the main relief valve 110, and when a hoist operation is being performed, will become ineffective to permit the pilot valve 136 to control the main relief valve. It should be noted that the combined external connection and passage 157 leading to by-pass port 78 of inlet section 12, intersects the unloading passage of the multiple valve bank between the two valve bores 18 and 30 which have mounted therein the valve members 20 and 32, respectively. When valve spool 20, which controls the tilt operation, is shifted upwardly or downwardly, as viewed in FIGURE 1, the by-pass or unloading passage 76–78 is closed at the valve bore 18 to close communication between the inlet supply port 24 and the tank port in the outlet section. However, by-pass port 78 of inlet section 12 is still open to return passages 80 leading to passages 82, 72, and 74 (and thus, the tank); and as the port 157 is connected to by-pass port 78 of the inlet section 12, the exhaust passage 146 of pilot valve 150 will be vented to tank to make the said lower pressure operating pilot valve 150 effective.

When the spool 32 for performing a hoist operation is shifted from the neutral position, however, the tilt spool 20 remains in neutral and the exhaust passage 146 of pilot valve 150 will be closed to the low pressure return portion of the system. When shifted downwardly, land 94 of valve member 32 closes port 76 to 78 of section 14 and thus, closes communication between port 78 of section 12 and the tank. Exhaust passage 146 of pilot valve 150 will also be closed to the tank which causes the pilot valve 150 to be ineffective. In addition, high inlet pressure required for performing the hoist operation is not only conducted to pressure port 56 of hoist spool 32 but also, by reason of passage 88, to the by-pass port 76 of valve bore 18, and to by-pass port 78 of the same inlet section, as the tilt spool 20 is in the neutral position. From the by-pass port 78 of section 12, high inlet pressure during the hoist operation is conducted by means of passage and external port 157 (connected to by-pass port 78 of section 12) and the hose 155 to the exhaust passage or chamber 146 of pilot valve 150 to the back of the pilot valve 150 to maintain the same upon the seat 148 of exhaust passage 146. Assuming that a hoist operation is being performed at 1500 p.s.i. and the loading of spring 152 of pilot valve 150 is 800 p.s.i., the pilot valve 150 will be maintained on its seat by a total resistance or force equal to a spring loading of 2300 p.s.i. In other words, hoist operating pressure is utilized in addition to the resistance force of the pilot valve spring to maintain pilot valve 150 on seat 148 when a hoist operation is being performed.

When either pilot valve within the system is operated, a differential of pressure is created across the main relief valve operating piston 110 greater than the light loading of spring 156; and the piston 110 is operated to connect the inlet recess 46 to the exhaust passage 142 of the bank for relieving excessive pressure fluid therethrough to maintain a pressure within the system at the level of the prevailing pilot valve.

There is, thus, provided a hydraulic system for controlling a plurality of motors wherein the individual motors for performing the different operations may be operated and controlled at different pressures. The dual pressure relief valve system may be simply and economically provided in well-known multiple valve bank systems having therein a pilot valve actuated main relief valve of the balanced type, by adding a cartridge assembly including another pilot valve to the system operating at a different pressure than the first pilot valve, and connecting the exhaust passage or venting side of said second pilot valve to the unloading passage of the valve bank beyond the first valve member of the bank. When the valve member in the bank for controlling a motor requiring high operating pressure is shifted, the exhaust passage of the second pilot valve is closed to the low pressure portion of the system and becomes ineffective. In addition, inlet pressure is connected to the exhaust passage of the second pilot valve so that the high operating pressure required for a hoisting operation, for example, is connected in back of the second pilot valve to maintain the same on its seat. The second pilot valve, which controls the low pressure operating motor of the system, is ineffective when the valve spool in the bank for controlling the motor requiring the highest pressure is shifted from a neutral position to an operating position. When the valve member for controlling the lowest operating pressure motor is shifted, the valve member for controlling the high operating pressure motor remains in the neutral position; and the exhaust passage of the second pilot valve is connected to the low pressure portion of the system because of being connected to the unloading passage of the valve bank beyond the valve member for operating the motor requiring the lowest operating pressure.

While the form of embodiment of the invention as herein disclosed constitutes a preferred form, it is to be understood that other forms might be adopted, all coming within the scope of the claims which follow.

What is claimed is as follows:

1. In a hydraulic power transmission wherein a plurality of directional valves for controlling a plurality of motors are connected in series to a by-pass passage adapted for connection ahead of the first valve in the series to a fluid pressure energizing source, such as a pump, and beyond the last valve member in the series to a low pressure portion of the transmission, such as a tank, said source being connected through the passage to the low pressure portion with all valve members in the neutral position and being closed from communication therewith when any valve member is shifted to the motor operating position, said passage remaining open beyond the shifted valve member to the low pressure portion, the combination of:
   (a) a main relief valve of the pilot valve controlled, substantially balanced type;
   (b) two pilot valves operable at different maximum pressures, either of which, when operated, causing operation of the main relief valve;
   (c) each pilot valve having an exhaust passage, the first of which is continuously vented to a low pressure portion of the system, the second of which is connected to the by-pass passage beyond the first directional valve in the series, whereby said first pilot valve is effective to control the main relief valve when any valve member beyond the by-pass passage connection is operated and said second pilot valve is effective to control the main relief valve when any valve member ahead of the by-pass passage connection is operated.

2. A transmission as in claim 1 wherein the pilot valve having the continuously vented exhaust passage is operative at a higher pressure than the second pilot valve, and said second pilot valve is made ineffective when any valve beyond the by-pass passage connection is operated by connecting the fluid pressure energy source to the exhaust passage of the second pilot valve in back of said second pilot valve to maintain said other pilot valve closed.

3. A transmission as in claim 1 wherein the pilot valve operable at the highest pressure, is carried by the main relief valve in a bore of a housing in which the other pilot valve is also mounted in opposed relation to the main relief valve and the pilot valve carried therein.

4. A transmission as in claim 3 wherein the directional valves are mounted in side-by-side housings forming a multiple valve bank including an inlet section and an outlet section, and the main relief valve and the two pilot valves are all mounted in a single bore in said inlet section.

5. In combination with a multiple valve bank of the type comprising a plurality of directional valves for controlling the operation of a plurality of motors and wherein the directional valves are connected in series to a passage adapted for connection at one end to a pressure fluid source, such as a fluid pump, and at its opposite end to a low pressure portion of the system, such as a fluid tank, for by-passing the source to the low pressure portion with all valves in the neutral position, and any of said valves, when shifted to a motor operating position, being adapted to close communication through said passage of the source with the low pressure portion, said passage remaining open to the low pressure portion beyond the shifted valve member:
   (a) a dual pressure relief valve system comprising a main relief valve of the substantially balanced type, and two pilot relief valves operable at different pressures, either of which, when operated, causing operation of the main relief valve;
   (b) each pilot valve having an exhaust passage which, when not vented, prevents operation of said pilot valve;
   (c) the exhaust passage of the pilot valve operable at the highest pressure being continuously vented to the low pressure portion of the system and the exhaust passage of the other pilot valve being connected to the by-pass passage beyond the first directional control valve in said series.

6. A multiple valve bank and dual pressure relief valve system as in claim 5 and wherein the pilot valve operative at the highest pressure is carried by the main relief valve and the operating surfaces of said pilot valves are located in directly opposed relationship.

7. A multiple valve bank and dual pressure relief valve system as in claim 5 wherein the bank comprises a plurality of housings in side-by-side relationship having inlet and outlet sections at opposite ends of the bank, said main relief valve and the two pilot valves being mounted in a single bore in the inlet section.

8. A multiple valve bank and dual pressure relief valve system as in claim 5 wherein a throttle is located in the said by-pass passage and the main relief valve, with all directional valves in the neutral position, is exposed to pressures ahead of and beyond the throttle, and performs the function of a flow regulating valve for the by-pass passage in addition to the function of a main relief valve.

9. A multiple valve bank and dual pressure relief valve system as in claim 8 wherein the bank includes an inlet section adapted for connection to the fluid source, and the main relief valve and two pilot valves are all mounted in said inlet section.

References Cited

UNITED STATES PATENTS

| | | | |
|---|---|---|---|
| 2,954,011 | 9/1960 | Krehbiel | 91—446 X |
| 3,052,218 | 9/1962 | Tennis | 91—414 |
| 3,160,076 | 12/1964 | Martin. | |
| 3,212,523 | 10/1965 | Martin | 137—491 X |

M. CARY NELSON, *Primary Examiner.*